(12) United States Patent
Reiz (10) Patent No.: US 8,719,374 B1
(45) Date of Patent: May 6, 2014

(54) ACCESSING LARGE DATA STORES OVER A COMMUNICATIONS NETWORK

(71) Applicant: Tim Reiz, Miami, FL (US)

(72) Inventor: Tim Reiz, Miami, FL (US)

(73) Assignee: Farelogix, Inc., Miami, FL (US)

( * ) Notice: Subject to any disclaimer, the term of this patent is extended or adjusted under 35 U.S.C. 154(b) by 33 days.

(21) Appl. No.: 14/031,574

(22) Filed: Sep. 19, 2013

(51) Int. Cl.
*G06F 15/16* (2006.01)
(52) U.S. Cl.
USPC .......................................................... 709/217
(58) Field of Classification Search
USPC .......................................................... 709/217
See application file for complete search history.

(56) References Cited

U.S. PATENT DOCUMENTS

| | | | |
|---|---|---|---|
| 5,790,849 A | 8/1998 | Crocker |
| 7,028,129 B2 | 4/2006 | Revilla |
| 7,499,057 B2 | 3/2009 | Wooten |
| 7,868,897 B2 | 1/2011 | Vembu |
| 8,327,109 B2 | 12/2012 | Caspole |
| 8,395,631 B1 | 3/2013 | Wilt |
| 8,397,241 B2 | 3/2013 | Xiaocheng |
| 8,451,281 B2 | 5/2013 | Ginzburg |
| 2005/0237329 A1 | 10/2005 | Rubinstein |
| 2006/0139360 A1 | 6/2006 | Panesar |
| 2010/0188411 A1 | 7/2010 | Semiannikov |
| 2012/0246381 A1 | 9/2012 | Kegel |
| 2013/0063450 A1 | 3/2013 | Kabawala |
| 2013/0159771 A1 | 6/2013 | Patel |

FOREIGN PATENT DOCUMENTS

| | | |
|---|---|---|
| EP | 0474435 A2 | 3/1992 |
| WO | 2013091185 A1 | 6/2013 |

*Primary Examiner* — Jerry Dennison
(74) *Attorney, Agent, or Firm* — Mark Terry (57) ABSTRACT

A method for facilitating access to a large data store is disclosed. The method includes reading the large data store, allocating a heap of at least 100 megabytes in a first memory, and storing the data store in the heap, wherein a memory address is associated with each memory element in the heap, and wherein each memory address comprises a base address unique to the first memory and an offset value from the base address. A second server allocates space in a second memory and stores a particular group of memory elements from the first memory in the second memory. Next, a graphics processing unit calculates new memory addresses for each of the memory elements in the particular group by adding a new base address, unique to the second memory, to the offset value of each memory address, and transmits the new memory addresses to the second memory.

19 Claims, 6 Drawing Sheets

ACCESSING LARGE DATA STORES OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of database access and, more specifically, the present invention relates to the field of accessing large data stores over communications networks.

BACKGROUND OF THE INVENTION

With the rise of cloud computing, various situations arise that involve accessing large data stores (defined as data stores or data objects that are over 100 megabytes in size) over a communications network. Accessing large amounts of data over a busy network like the Internet, however, is associated with a number of drawbacks. Limited broadband can limit access to the data store, and long access times can render the system unusable. Furthermore, access to commercially available databases often requires a license, which brings up financial considerations when the number of users or computers accessing the database increases.

A well known example that involves accessing large data stores over a communications network involves the airline industry. The Airline Tariff Publishing Company, or ATPCO, is a corporation that publishes the latest airfares for more than 500 airlines multiple times per day. ATPCO provides fare data in an electronic format with the encoded rules associated with those fares, which makes the information suitable for computer processing. Users of the fare data and rules provided by ATPCO include travel agents, computer reservation systems of airlines, and other service providers in the travel industry. As one may imagine, the amount of fare data and rules is very large. When a user of the fare data is first introduced to the system, the user must download from ATPCO an initial data store with a large size—from tens of Gigabytes up to 1 Terabyte in size. The initial data store reflects all fare data and rules for the last 12 months. Subsequently, the new user must download updates of the fare data and rules from ATPCO at least daily—sometimes up to four times daily. Each update can be from 100 megabytes to several gigabytes in size.

All of the fare data and rules that are downloaded must be easily accessible to clients over a communications network. For example, if the user of the data is an airline computer reservation system, then the data store must be accessible to hundreds or thousands of remotely located reservations personnel making reservations for passengers at the same time. Further, for customer service reasons, reservations personnel must be able to access the fare data and rules quickly. Due to the large amount of data being stored and remotely accessed via a communications network, however, storage of the fare data and rules on a standard hard disk drive can result in long access times that render the system unusable. Further, when the data store must be accessible to a large number of clients, then the traffic may interfere with access times as well. In another example, if the user of the data is an online travel agency, the data store must be easily (and quickly) accessible to hundreds and sometimes thousands of clients requesting fare data over the Internet at the same time. If the traffic attributed to data requests over-burdens the system, then access times suffer. Lastly, most commercially available databases require licenses for each entity accessing the database. Thus, many paradigms designate a single server that acts as the requesting node for the licensed database. This arrangement, however, can over-burden the requesting node during busy periods and is not optimal for efficiency reasons.

Therefore, a need exists to overcome the problems with the prior art, and more specifically, there is a need for a more efficient system and method for accessing large data stores over a communications network.

BRIEF SUMMARY OF THE INVENTION

In one embodiment, the present invention discloses a method for facilitating access to a large data store over a communications network. The method includes: a) reading, by a first server, the large data store, b) allocating, by the first server, a heap of at least 100 megabytes in a first memory, and storing the data store in the heap, wherein a memory address is associated with each memory element in the heap, and wherein each memory address comprises a base address unique to the first memory and an offset value from the base address, c) receiving, by the first server, a request from a second server for a particular group of memory elements of the heap in the first memory, d) transmitting, by the first server, the particular group of memory elements of the heap in the first memory to the second server, e) allocating, by the second server, space in a second memory and storing in the second memory the particular group of memory elements received from first server, f) transmitting, by the second server, memory addresses currently associated with each of the memory elements in the particular group to a graphics processing unit communicatively coupled with the second server, g) calculating, by the graphics processing unit, new memory addresses for each of the memory elements in the particular group by adding a new base address unique to the second memory to the offset value of each memory address, and, h) transmitting, by the graphics processing unit, the new memory addresses for each of the memory elements in the particular group to the second memory, wherein the new memory addresses are used by the second server to access the memory elements in the particular group.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The disclosed embodiments improve upon the problems with the prior art by providing a system that allows for quick and easy access of data within large data stores over a communications network. The disclosed embodiments leverage the reduced costs of volatile memory currently being experienced and the wide availability of graphics processing units (GPUs) in most servers and computers to produce a system where a large data store, or portions thereof, are made available on memory to multiple customer computers over a communications network. Customer computers execute a direct memory access and use their own GPUs to translate memory addresses for their own use. This process reduces access times for data in the large data store, and provides for quicker access to data for customer computers. This is advantageous for customers such as online travel agencies and airline reservations worker, who require fast access to fare records on a constant basis. An additional benefit of the disclosed embodiments is the reduction in the need for licenses to access the data in the large data store. The disclosed embodiments include an arrangement defining a reduced number of nodes or computers that access the database storing the large data store, thereby reducing the number of licenses necessary to access the database. This is beneficial for organizations that are financially sensitive to the increasing costs of database access licenses.

Figure 1:
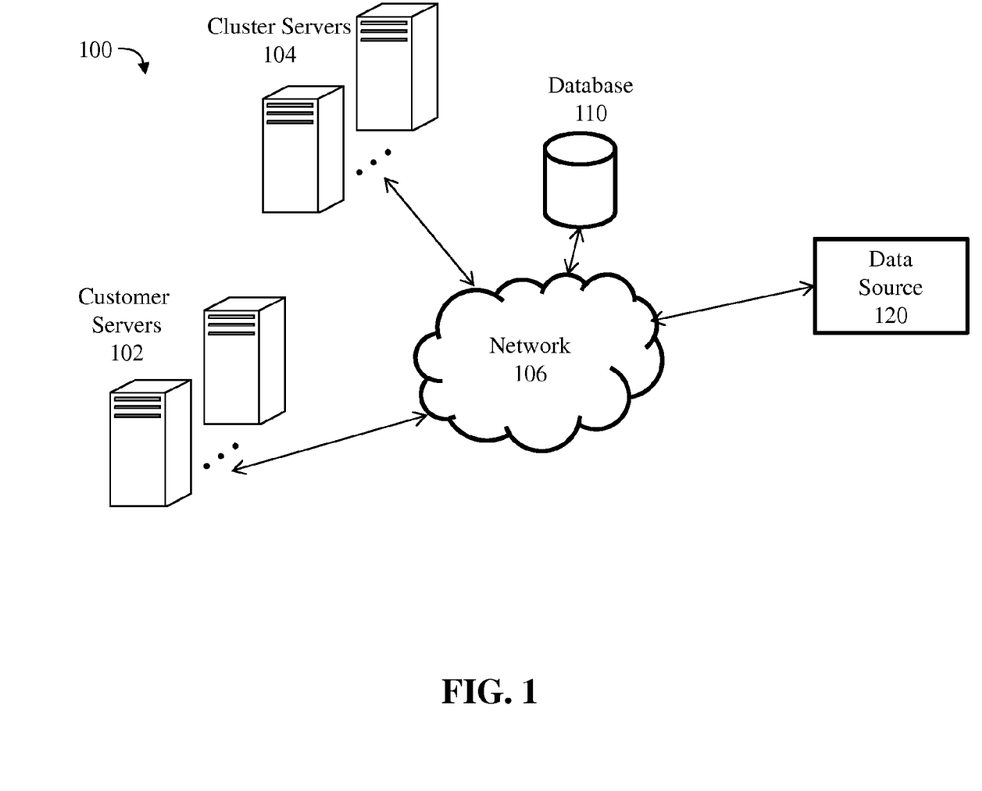
FIG. 1 is a block diagram illustrating the network architecture of a system for facilitating access to a large data store over a communications network, in accordance with one embodiment of the present invention.

Referring now to the drawing figures in which like reference designators refer to like elements, there is shown in FIG. 1 an illustration of a block diagram showing the network architecture of a system 100 and method for facilitating access to a large data store over a communications network in accordance with the principles of the present invention. FIG. 1 shows various components coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Data source 120 is the original source of the large data store, such as ATPCO being the source of the large data store representing the fares and fare rules of the airline industry. A large data store is defined as an amount of data exceeding 100 megabytes. Data source 120 may represent one or more servers or computers that perform the services of the data source, such as compiling the large data store and making it available for users or consumers of the data over the network 106.

FIG. 1 further includes one or more customer servers 102, which can be, for example, consumers of airline fare and fare rule data, such as travel agents, computer reservation systems of airlines, and other service providers in the travel industry. FIG. 1 also shows one or more cluster servers 104, which can be, for example, a provider of airline fare and fare rule data. Customer servers 102 and cluster servers 104 may comprise one or more servers, workstations, desktop computers, computer terminals, workstations, mainframes, mobile computing devices, smart phones, mobile phones, handheld computers, laptops, or the like. Customer servers 102 and cluster servers 104 may each include a software engine that delivers applications, data, program code and other information to networked computing devices. Customer servers 102 and cluster servers 104 are described in greater detail below.

FIG. 1 further shows a database or repository 110, which may be a relational database comprising a Structured Query Language (SQL) database stored in a SQL server. The repository 110 serves data from a database, which is a repository for data used by customer servers 102 and cluster servers 104 during the course of operation of the invention. Database 110 may be distributed over one or more nodes or locations that are connected via network 106.

The database 110 may include fare records, which are records in the database of the computer reservation system that contains the details of a fare. A fare record may include: the departure and arrival cities, airports or pseudo-city codes of the fare, the airline providing the fare, a timestamp, the prices associated with the fare, dates and times associated with the fare, fare details and any restrictions that may apply to the ticket, optional services instruction, other service information, vendor remarks, passenger name records or references/pointers to same, etc. The database 110 may also include fare rule records, which are rules in the database of the computer reservation system that describe how fares are applied and may be changed. A fare rule record may include: blackout dates, memberships in organizations, identities of credit card issuers, additional services that may apply, upgrades that may apply, and any of the data that may be included in a fare record. Fare rule records may also include travel days, sales dates, flight restrictions, mileage restrictions, journey time, applicable regions, etc. In another embodiment, the database 110 may include other records, such as inventory records, records for physical or tangible products or any other record that stores the quantity and kind of product/inventory at hand, committed to firm-orders or to work-in-process, and on order.

The database 110 may further include passenger name records, which are records in the database of a computer reservation system that contains the itinerary for a passenger, or a group of passengers travelling together. A passenger name record may include: contact/identifying information for the passenger (name, address, telephone number(s), email address, etc.), contact/identifying information for the travel agent or airline ticket office that generated the ticket (if any), ticketing details such as a ticket number of a ticketing time limit, an itinerary for at least one travel segment, the name of the person providing the information or making the booking, a timestamp, the booking agency's pseudo-city code, a unique all alpha or alpha-numeric record locator, fare details and any restrictions that may apply to the ticket, additional passenger contact details, passenger age details, passenger frequent flyer data, special service request codes (special meals, etc.), optional services instruction, other service information, vendor remarks, the passenger's gender, passenger passport details, date and place of the passenger's birth, redress number, and all available payment/billing information. In one embodiment, one or more portions of passenger name records, fare records and fare rule records may be combined into one or more records.

It should be noted that although FIG. 1 shows only one data source 120, one database 110, one set of cluster servers 104 and one set of customer servers 102, the system of the present invention supports any number of data sources, databases, sets of cluster servers and sets of customer servers connected via network 106. Also note that although one or more customer servers 102 are shown as single and independent entities, in one embodiment, the functions of one or more customer servers 102 may be integrated with another entity, such as one or more cluster servers 104 and/or the database 110. Further, customer servers 102 and their functionality, according to a preferred embodiment, can be realized in a centralized fashion in one computer system or in a distributed fashion wherein different elements are spread across several interconnected computer systems. Likewise, cluster servers 104 and their functionality, can be realized in a centralized fashion in one computer system or in a distributed fashion wherein different elements are spread across several interconnected computer systems.

100 megabytes as a size is significant because, on average, the minimum size of a data update from ATPCO is about 100 megabytes in size. Thus, in order to quickly and easily read, organize, store and access all data updates from the data source 120, the customer servers 12 and the cluster server 104, must be able to handle at least 100 megabytes in size. This amount of data is also significant because currently the cost memory is about $1.30 per 100 megabytes, which makes the cost of 100 megabytes highly affordable to purchase, even in large quantities.

Figure 2A:
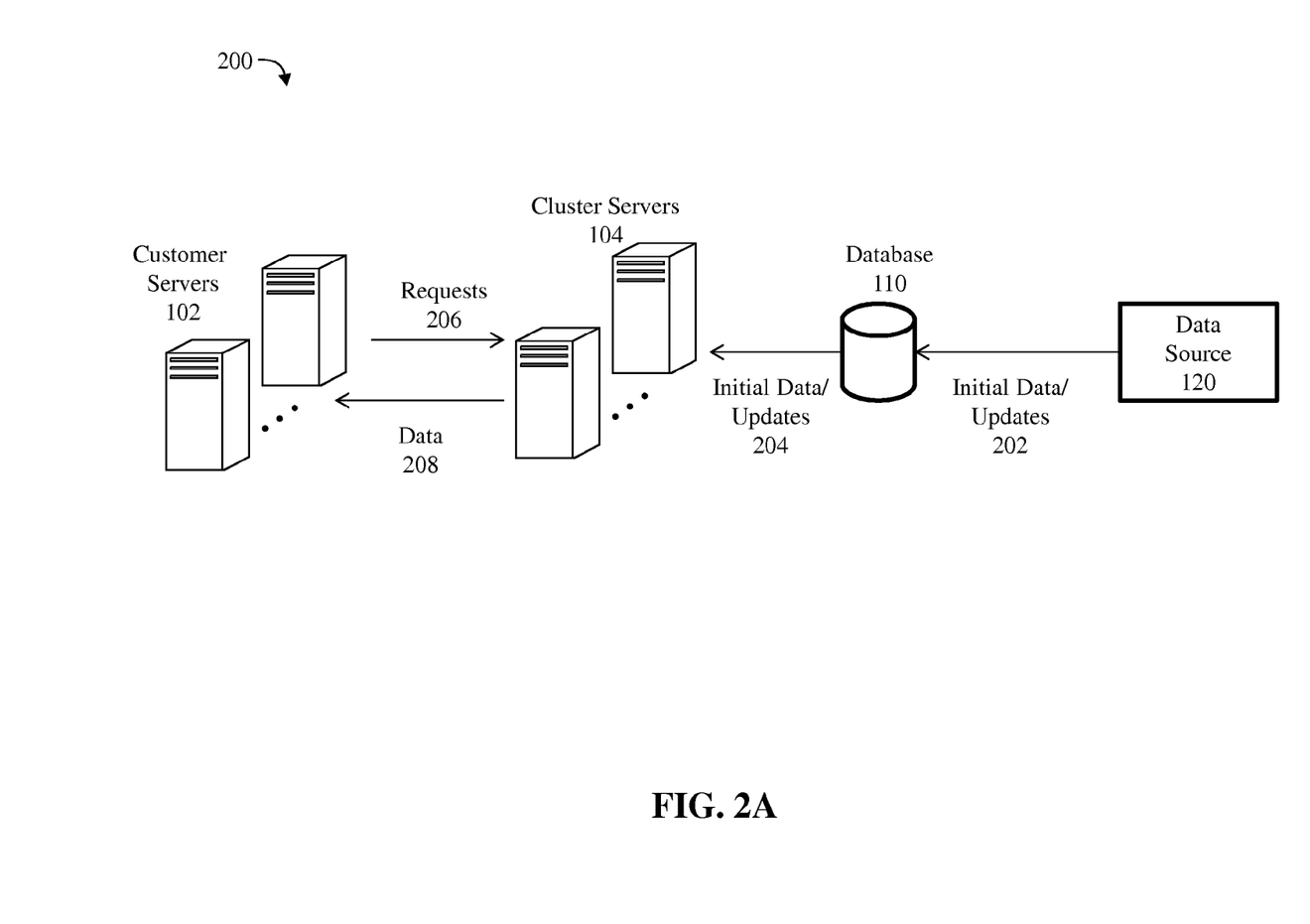
FIG. 2A is a block diagram illustrating the data flow of the system for facilitating access to a large data store over a communications network, in accordance with one embodiment.
Figure 2B:
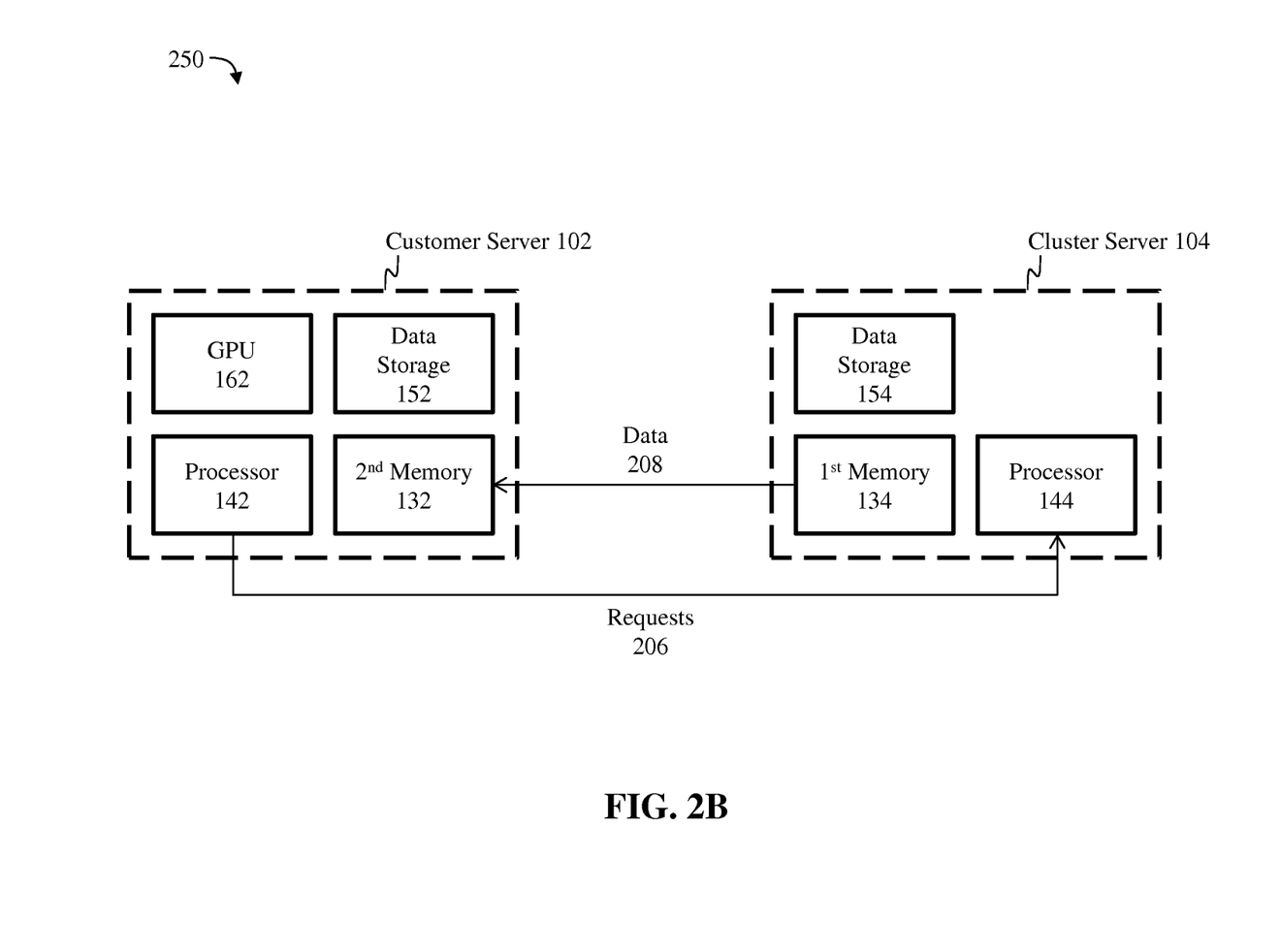
FIG. 2B is a block diagram illustrating the main components of the cluster server and the customer server, in accordance with one embodiment.
Figure 2C:
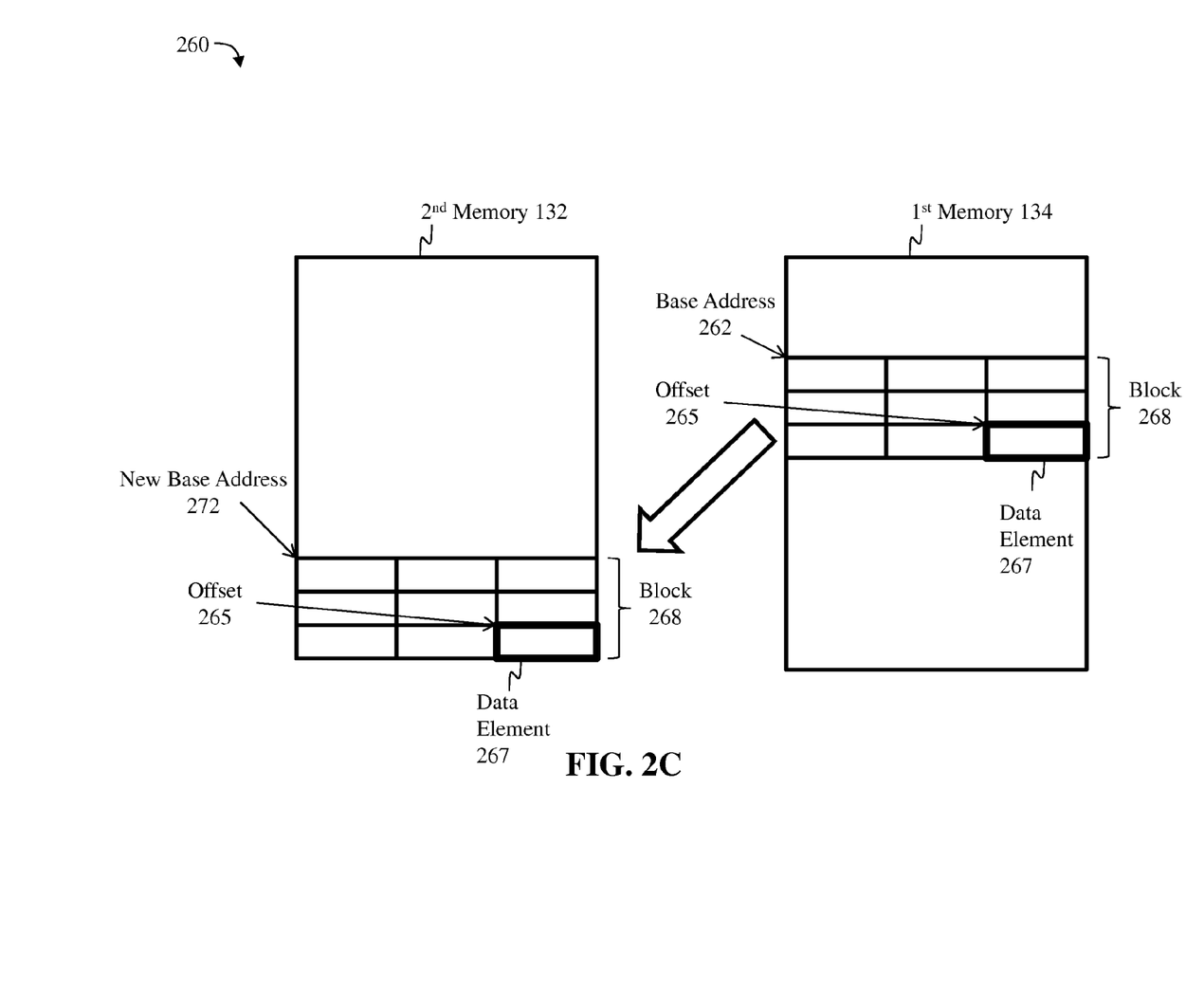
FIG. 2C is a block diagram illustrating the transfer of a group of memory elements from a large data store over a communications network, in accordance with one embodiment.
Figure 3:
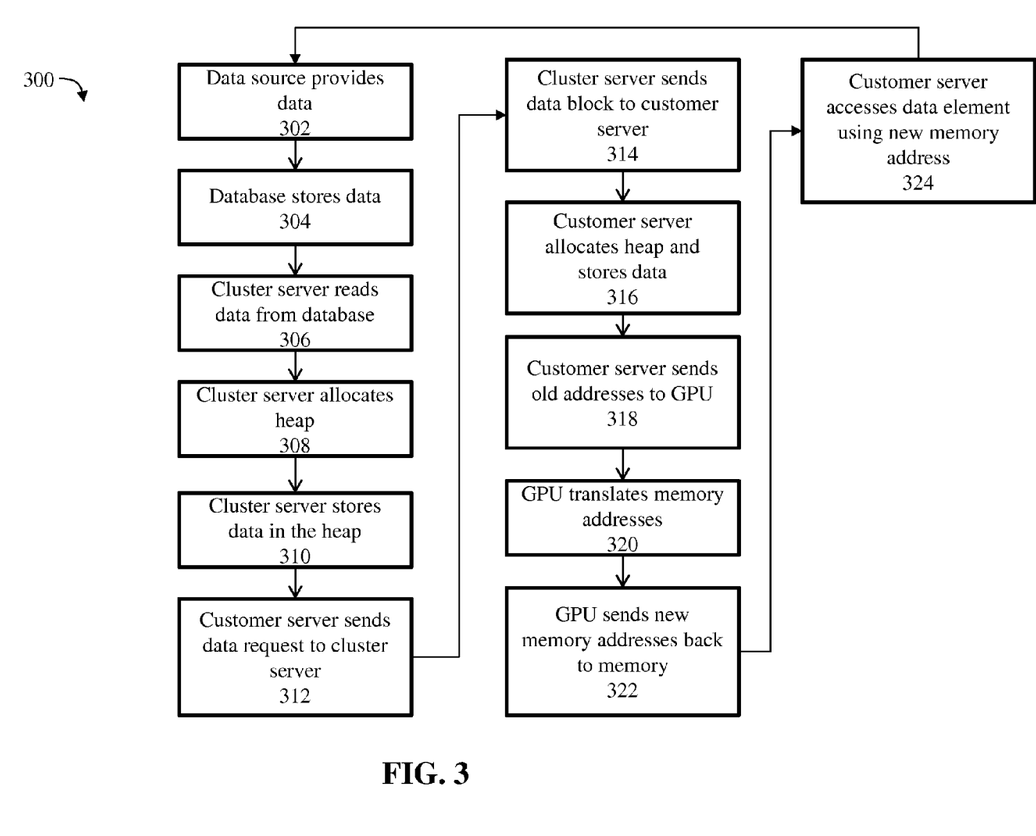
FIG. 3 is a flow chart depicting the general control flow of the process for facilitating access to a large data store over a communications network, according to one embodiment.

The process of facilitating access to a large data store over a communications network will now be described with reference to FIGS. 2A through 3 below. FIGS. 2A through 3 depict, among other things, the data flow and control flow in the process for facilitating access to a large data store over a communications network 106, according to one embodiment. The process of the disclosed embodiments begins with step 302 (see flowchart 300), wherein the data source 120 provides a large data store 202 to the database 110. The data 202 may be an initial data store with a large size—from hundreds of gigabytes up to 1 terabyte in size—or may be updates of the data already present in the database 110—which updates may be up to 100 megabytes in size. In one embodiment, the data 202 is provided to database 110 via TCP/IP and/or HTTP over network 106.

In step 304, the database 110 stores the data 202 in the database 110 and performs any necessary processing of the data, such as indexing. In step 306, the processor 144 of the cluster server(s) 104 (see diagram 200 of FIG. 2A and diagram 250 of FIG. 2B) reads all or a portion of the data 202 from the database 110. In one embodiment, the cluster server 104 reads the data from the database 110 via TCP/IP and/or HTTP over network 106. Also in step 306, the cluster server 104 performs any necessary processing of the data from the database 110, such as indexing, compressing, organizing, etc. In one example, when recording a record, the cluster server 104 includes direct references and/or linked lists among records, thereby avoiding map lookup at runtime. In another example, when recording a record, the cluster server 104 transforms records into compressed structures.

In step 308, the processor 144 of the cluster server(s) 104 allocates a heap using an amount of memory in the first memory 134 to accommodate the quantity of the data that was read in step 306 above. A heap is an area of pre-reserved memory in a computer that a computer program can use to store data. The first memory 134 may comprise RAM, SRAM, DRAM, PRAM, or any other volatile memory. In one embodiment, the size of the heap is at least 100 megabytes in size.

In another embodiment, in step 308, the processor 144 of the cluster server(s) 104 allocates a heap (in this case, a distributed heap) in distributed memory, which may include the use of the first memory 134, the data storage 154, memory and data storage on other computers and servers, as well as other nodes accessible via the network 106, to accommodate the quantity of the data that was read in step 306 above. Distributed memory refers to the storage of data in variety of places, including volatile and non-volatile data storage, both locally and over the network 106. A distributed memory is managed by a memory manager or a heap manager and is used by a computer program to store data. The virtual memory process, which is well known in the art, may be used to implement the distributed memory and/or distributed heap. Virtual memory is a memory management technique that is implemented using both hardware and software. The virtual memory process maps memory addresses used by a program, called virtual addresses, into physical addresses in computer memory. Data storage 154 may comprise non-volatile memory, such as one or more hard drives, solid state drives, solid sate hybrid drives, or the like.

In step 310, the processor 144 of the cluster server(s) 104 stores the data that was read in step 306 above into the heap or distributed heap that was allocated in step 308 above. In step 312, the processor 142 of the customer server(s) 102 sends a data request 206 to the processor 144 of the cluster server(s) 104. In one embodiment, the customer server(s) 102 sends the request via TCP/IP and/or HTTP over network 106. The data request 206 may request one or more data elements from the data store located in the heap or distributed heap promulgated by cluster server(s) 104. A data element may be one or more portions of passenger name records, fare records and fare rule records. In step 314, in response to the data request 206, the processor 144 of the cluster server(s) 104 transmits a data block 208 to the processor 142 of the cluster server(s) 102. In one embodiment, the cluster server(s) 104 transmits the data block via TCP/IP and/or HTTP over network 106.

In step 316, the processor 142 of the customer server(s) 102 allocates a heap or distributed heap using an amount of memory in the second memory 132 to accommodate the quantity of the data 208 that was transmitted in step 314 above Like cluster server 104, the customer server 102 may store the data received in a distributed memory as well. The data elements in the memory block 208 transferred to the customer server 102, however, require new memory addresses. The necessity for new memory addresses for data elements in the memory block transferred to the customer server 132 is illustrated in FIG. 2C below.

FIG. 2C shows that the particular data element 267 (or memory element), which may be, for example, a fare record, located in a particular location in the first memory 134 of the cluster server 104. The memory address of the particular data element 267 is defined as the base address 262 followed by an offset 265. The base address 262 is an address that is specific to the memory arrangement of the first memory 134 of the cluster server 104. The offset 265 is a number indicating the distance, or number of characters or number bits, from the beginning of the memory block 268. A memory block, also called a page, a memory page, or virtual page, is a fixed-length contiguous block of the first memory 134.

FIG. 2C also shows, however, that when the block 268 is moved to the second memory 132, the base address 262 is no longer valid. Since the entire block 268 is moved to the second memory 132, the offset 265 is still valid since the offset indicates the distance from the beginning of the memory block 268, which has remained unchanged. But since the base address 262 is an address that is specific to the memory arrangement of the first memory 134 of the cluster server 104, upon movement of the memory block 268 to the second memory 132, the base address 262 is no longer valid. Thus, in order to properly access the block 268 and the data element 267 in the second memory 132, a new base address 272 is necessary. Below is provided more detail on how the graphics processing unit (GPU) 162 of the customer server 102 performs a translation of the base address 262 to a new base address 272 that is specific to the memory arrangement of the second memory 132 of the customer server 102.

Returning to the flowchart of FIG. 3, in a subsequent step 318, the processor 142 of the customer server(s) 102 transmits memory addresses currently associated with each of the memory elements (or data elements) in the block 268 to a GPU 162 communicatively coupled with the processor 142 of the customer server(s) 102. A GPU is a specialized electronic circuit designed to rapidly manipulate and alter memory to accelerate the creation of images in a frame buffer intended for output to a display. GPUs are efficient at manipulating computer graphics, and their highly parallel structure makes them more effective than general-purpose CPUs for algorithms where processing of large blocks of data is done in parallel. In a computer, a GPU can be present on a video card, on the motherboard or on the CPU die.

In step 320, the GPU 162 calculates new memory addresses for each of the memory elements in the block 268 by adding a new base address, unique to the second memory 132, to the offset value of the memory address of each memory element in block 268. In effect, the GPU 162 replaces a current base address of each memory address with a new base address unique to the second memory 132. In one embodiment, the GPU 162, which is uniquely suited to perform arithmetic logic operations, performs an "add" operation for each current memory address for each of the memory elements in the block 268. Specifically, the "add" operation takes as input: 1) a new base address, unique to the second memory 132, and 2) the offset address for a current memory address. The result of the aforementioned operation is the creation of new memory address for a memory element of block 268, wherein the new memory address comprises the new base address, unique to the second memory 132, and the original offset address the memory element.

Note the offset portion of each memory address stays the same—only the base address portion of each memory address is modified by the GPU 1672 in step 320. In step 322, the GPU 162 transmits the new memory addresses for each of the memory elements in the block 268 to the second memory 132, so that the processor 142 may use the new memory addresses to access the memory elements in the block 268. In step 324, the processor 142 of the customer server(s) 102 accesses at least one memory element in the block 268 from the second memory 132 using a corresponding new memory address for the at least one memory or data element 267. Subsequently, control flows back to step 302 wherein the entire process may be repeated again.

Figure 4:
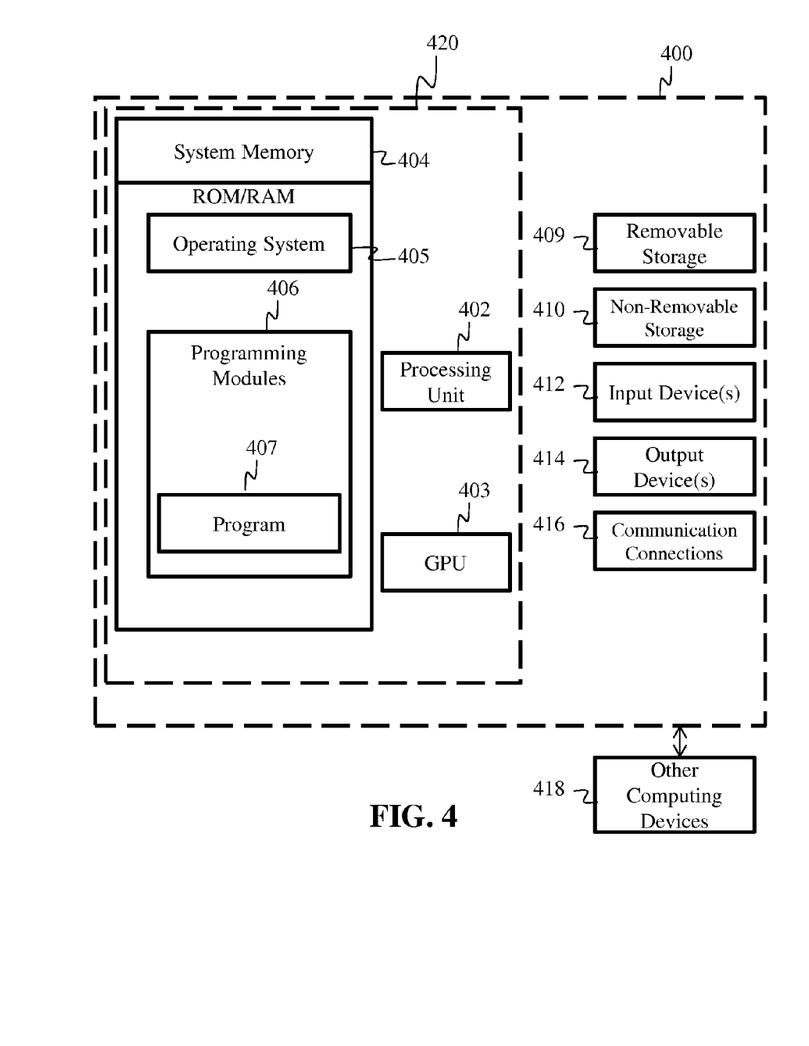
FIG. 4 is a block diagram of a system including an example computing device and other computing devices.

FIG. 4 is a block diagram of a system including an example computing device 400 and other computing devices. Consistent with the embodiments described herein, the aforementioned actions performed by servers 102 and 104 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the methods shown in FIGS. 2A-3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIGS. 2A-3 above. Computing device 402 may also include a graphics processing unit 403, which supplements the processing capabilities of processor 402 and which may execute programming modules 406, including all or a portion of those processes and methods shown in FIGS. 2A-3 above The aforementioned processes are examples, and processing units 402, 403 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating access to a large data store over a communications network, comprising:
   a) reading, by a first server, the large data store;
   b) allocating, by the first server, a heap of at least 100 megabytes in a first memory, and storing the data store in the heap, wherein a memory address is associated with each memory element in the heap, and wherein each memory address comprises a base address unique to the first memory and an offset value from the base address;
   c) receiving, by the first server, a request from a second server for a particular group of memory elements of the heap in the first memory;
   d) transmitting, by the first server, the particular group of memory elements of the heap in the first memory to the second server;
   e) allocating, by the second server, space in a second memory and storing in the second memory the particular group of memory elements received from first server;
   f) transmitting, by the second server, memory addresses currently associated with each of the memory elements in the particular group to a graphics processing unit communicatively coupled with the second server;
   g) calculating, by the graphics processing unit, new memory addresses for each of the memory elements in the particular group by adding a new base address unique to the second memory to the offset value of each memory address; and
   h) transmitting, by the graphics processing unit, the new memory addresses for each of the memory elements in the particular group to the second memory, wherein the new memory addresses are used by the second server to access the memory elements in the particular group.

2. The method of claim 1, further comprising:
   accessing, by the second server, at least one memory element in the particular group from the second memory using a corresponding new address for the at least one memory element.

3. The method of claim 2, wherein the step of allocating the heap further comprises:
   allocating the heap in the first memory, wherein a memory address is associated with each memory element, which comprises a fare record or a fare rule record.

4. The method of claim 3, wherein the step of receiving the request from the second server further comprises:
   receiving a TCP/IP request from the second server for the particular group of memory elements in the heap.

5. The method of claim 4, wherein the step of transmitting the particular group of memory elements further comprises:
   transmitting, by the first server, the particular group of memory elements of the heap in the first memory to the second server via TCP/IP.

6. The method of claim 5, wherein the step of allocating space in the second memory further comprises:
   allocating, by the second server, space in the second memory comprising distributed memory, and storing the particular group of memory elements in the second memory.

7. The method of claim 6, wherein the step of allocating a heap of at least 100 megabytes in the first memory further comprises:
   allocating, by the first server, the heap of at least 100 megabytes in the first memory;
   organizing the data store; and
   storing the data store that was organized in the heap.

8. A method for facilitating access to a large data store over a communications network, comprising:
   a) reading, by a first server, the large data store;
   b) allocating, by the first server, a distributed heap of at least 100 megabytes in a first distributed memory, and storing the data store in the heap, wherein a memory address is associated with each memory element in the heap, and wherein each memory address comprises a base address unique to the first distributed memory and an offset value from the base address;
   c) receiving, by the first server, a request from a second server for a particular group of memory elements of the heap in the first memory;
   d) transmitting, by the first server, the particular group of memory elements of the heap in the first distributed memory to the second server;
   e) allocating, by the second server, space in a second distributed memory and storing in the second distributed memory the particular group of memory elements received from the first server;
   f) transmitting, by the second server, memory addresses currently associated with each of the memory elements in the particular group to a graphics processing unit communicatively coupled with the second server;
   g) calculating, by the graphics processing unit, new memory addresses for each of the memory elements in the particular group by adding a new base address unique to the second memory to the offset value of each memory address; and
   h) transmitting, by the graphics processing unit, the new memory addresses for each of the memory elements in the particular group to the second distributed memory, wherein the new memory addresses are used by the second server to access the memory elements in the particular group.

9. The method of claim 8, further comprising:
   accessing, by the second server, at least one memory element in the particular group from the second distributed memory using a corresponding new address for the at least one memory element.

10. The method of claim 9, wherein the step of allocating a distributed heap further comprises:
    allocating the heap in the first distributed memory, wherein a memory address is associated with each memory element, which comprises a fare record or a fare rule record.

11. The method of claim 10, wherein the step of receiving a request from the second server further comprises:
    receiving a TCP/IP request from the second server for the particular group of memory elements in the heap.

12. The method of claim 11, wherein the step of transmitting the particular group of memory elements further comprises:
    transmitting, by the first server, the particular group of memory elements of the heap in the first distributed memory to the second server via TCP/IP.

13. The method of claim 12, wherein the step of allocating a heap of at least 100 megabytes in the first distributed memory further comprises:
    allocating, by the first server, the heap of at least 100 megabytes in the first distributed memory;
    organizing the data store; and
    storing the data store that was organized in the heap.

14. A system for facilitating access to a large data store over a communications network, comprising:
    a first server including a first memory and a processor configured for:
       a) reading the large data store; and
       b) allocating a heap of at least 100 megabytes in the first memory, and storing the data store in the heap, wherein a memory address is associated with each memory element in the heap, and wherein each memory address comprises a base address unique to the first memory and an offset value from the base address; and
    a second server including a second memory, a processor and a graphics processing unit communicatively coupled with the processor, wherein the processor is configured for:
       a) sending a request to the first server for a particular group of memory elements in the heap;
       b) receiving the particular group of memory elements from the first server;
       c) allocating space in a second memory and storing in the second memory the particular group of memory elements received from first server; and
       d) transmitting memory addresses currently associated with each of the memory elements in the particular group to the graphics processing unit, wherein the graphics processing unit is configured for:
          i) calculating new memory addresses for each of the memory elements in the particular group by adding a new base address unique to the second memory to the offset value of each memory address; and
          ii) transmitting the new memory addresses for each of the memory elements in the particular group to the second memory, wherein the new memory addresses are used by the second server to access the memory elements in the particular group.

15. The system of claim 14, wherein the processor of the second server is further configured for:
    accessing at least one memory element in the particular group from the second memory using a corresponding new address for the at least one memory element.

16. The system of claim 15, wherein the step of allocating the heap further comprises:
    allocating the heap in the first memory, wherein a memory address is associated with each memory element, which comprises a fare record or a fare rule record.

17. The system of claim 16, wherein the step of sending the request to the first server for a particular group of memory elements in the heap further comprises:
    sending a TCP/IP request to the first server for a particular group of memory elements in the heap.

18. The system of claim 17, wherein the step of receiving the particular group of memory elements from the first server further comprises:
    receiving the particular group of memory elements from the first server via TCP/IP.

19. The system of claim 18, wherein the second memory comprises distributed memory.

\* \* \* \* \*